United States Patent [19]

Willis

[11] 4,234,829

[45] Nov. 18, 1980

[54] HIGH VOLTAGE DISABLING CIRCUIT FOR A TELEVISION RECEIVER

[75] Inventor: Donald H. Willis, Indianapolis, Ind.

[73] Assignee: RCA Corporation, New York, N.Y.

[21] Appl. No.: 80,839

[22] Filed: Oct. 1, 1979

[51] Int. Cl.³ ............................................. H01J 29/70
[52] U.S. Cl. ..................................... 315/411; 358/243
[58] Field of Search ................ 315/411, 408; 358/190, 358/243

[56] References Cited

U.S. PATENT DOCUMENTS

| | | | |
|---|---|---|---|
| 4,042,859 | 8/1977 | Kashiwagi | 358/243 |
| 4,045,742 | 8/1977 | Meehan et al. | 328/9 |
| 4,047,078 | 9/1977 | Meehan | 315/411 |
| 4,145,639 | 3/1979 | Willis | 358/243 |

Primary Examiner—Theodore M. Blum

Attorney, Agent, or Firm—Eugene M. Whitacre; William H. Meagher; Joseph J. Laks

[57] ABSTRACT

A deflection generator develops scanning current in a horizontal deflection winding. A high voltage winding of a flyback transformer generates a high voltage for the picture tube ultor terminal. A high voltage safety circuit includes a flyback transformer secondary winding for applying a peak detected retrace pulse voltage to a disabling latch circuit. If the high voltage exceeds predetermined values, the latch is energized and disables normal operation of the deflection generator. Components of the sustaining current that maintains the latch in a regeneratively conducting state are derived from two voltage sources, with the current component derived from one of the two voltage sources by itself insufficient to maintain the latch in the regeneratively conducting state.

6 Claims, 2 Drawing Figures

HIGH VOLTAGE DISABLING CIRCUIT FOR A TELEVISION RECEIVER

BACKGROUND OF THE INVENTION

This invention relates to disabling circuits for television receivers.

The high voltage or ultor accelerating potential for a picture tube typically is derived by rectifying retrace pulses generated in the high voltage winding of a horizontal output of flyback transformer of the horizontal deflection circuit. High brightness color picture tubes may require the development of relatively large ultor accelerating potential. Care must be taken that the developed ultor potential not exceed safe operating levels in order to prevent the generation of excessive amounts of x-radiation.

Should the high voltage exceed predetermined levels, typical high voltage safety circuits incorporate latching circuits which shut down or disable normal deflection circuit operation and high voltage generation under these conditions.

The supply voltage for the latch should be derived from a voltage source which, during start-up or initial energization of the television receiver, will not cause the latching circuit to nuisance trip or erroneously energize. A supply source should be selected which would enable the latch to be deenergized after television receiver shutdown, in order to permit the operator to restart the television receiver. The supply source selected, however, should not enable the television receiver to automatically cycle between shutdown and start-up modes of operation, as harmful stresses may be applied to various television receiver elements such as the flyback transformer and the horizontal output transistor.

SUMMARY OF THE INVENTION

A deflection generator generates scanning current in a deflection winding. A flyback transformer is coupled to the deflection winding, and a high voltage generating circuit coupled to the transformer generates a high voltage. A detection circuit responsive to the high voltage generates a first signal representative of high voltage. A disabling latch coupled to the detection circuit and to the deflection generator generates a disabling signal for disabling normal deflection generator operation upon energization of the latch by the detection circuit when the first signal exceeds predetermined values. A sustaining current maintains the latch in a regeneratively conducting state after energization. A first source of voltage coupled to the disabling latch provides a first component of the sustaining current, and a second source of voltage coupled to the disabling latch provides a second component of the sustaining current component. At least one of the first and second sustaining current components by itself is insufficient to maintain the disabling latch in a regeneratively conducting state.

DESCRIPTION OF THE INVENTION

Figure 1:
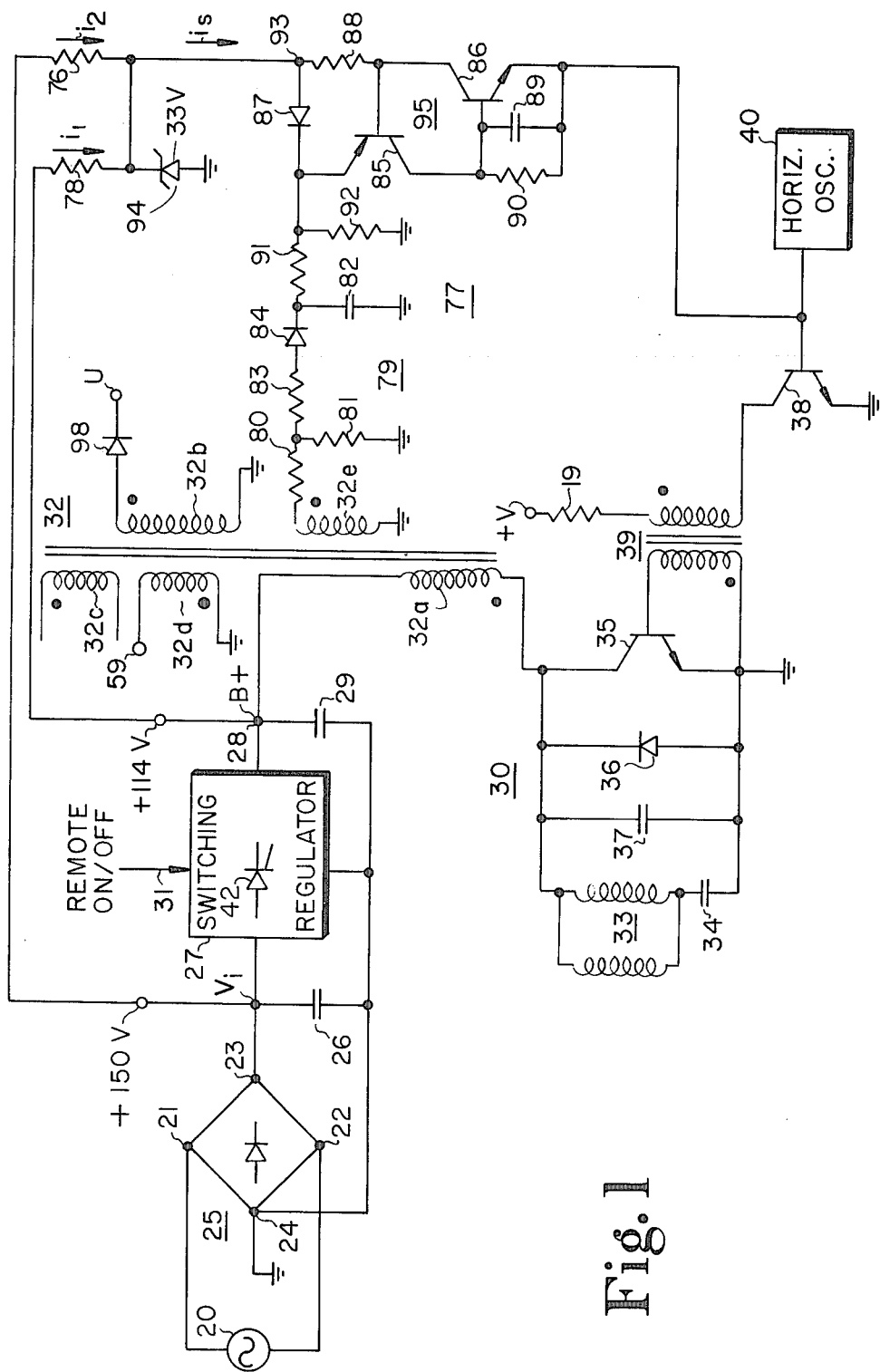
FIG. 1 illustrates a television receiver deflection and high voltage circuit embodying the invention, including a disabling circuit.

In FIG. 1, a source of alternating current power line or mains supply voltage is connected to input terminals 21 and 22 of a full-wave bridge rectifier 25. A filter capacitor 26 is coupled across output terminals 23 and 24 of rectifier 25, with terminal 24 functioning as a ground or common current return terminal. A filtered but unregulated DC input voltage $V_i$, illustratively of +150 volts DC, is developed at terminal 23, which terminal functions as a supply input terminal for a switching regulator 27 of a television receiver. A regulated B+ supply voltage, illustratively of +114 volts DC, is developed at a terminal 28 for use by various television receiver circuits such as a horizontal deflection and high voltage generator 30. A B+ voltage filter capacitor 29 is coupled between terminal 28 and ground.

The B+ voltage at terminal 28 is applied through the primary winding 32a of a horizontal output flyback transformer 32 to the series arrangement of a horizontal deflection winding 33 and "S" shaping capacitor 34. Horizontal deflection and high voltage generator 30 includes a horizontal output transistor 35, damper diode 36 and retrace capacitor 37, for generating scanning current in deflection winding 33 in a conventional manner each deflection cycle. Horizontal rate square-wave drive signals developed by a horizontal driver transistor 38 are applied to horizontal output transistor 35 through a transformer 39, in response to synchronized square-wave signals developed by a conventional horizontal oscillator 40. Collector voltage for transistor 38 is obtained from a +V source through a resistor 19.

Flyback transformer 32 includes a high voltage winding 32b. The retrace pulse voltage developed in winding 32b is rectified by a diode 98 to develop a high voltage or ultor accelerating potential at an ultor terminal U of the television receiver picture tube. Other flyback transformer windings, not illustrated in FIG. 1, may be used to generate auxiliary DC supply voltages for the television receiver. The voltages developed in flyback transformer windings 32c and 32d are applied across various circuit terminals within switching regulator 27 for purposes hereinafter to be described.

The television receiver circuits illustrated in FIG. 1 are designed to be used in conjunction with remote on/off operation of the television receiver. A conventional remote control ultrasonic or infrared transmitter radiates encoded signals that are intercepted and decoded by conventional remote control circuits of the television receiver in order to generate various functional commands within the receiver. One of the commands comprises an on/off command signal applied to a conductor line 31 in FIG. 1 in order to energize or turn on many of the television receiver circuits under normal television receiver operation.

As illustrated in FIG. 1, the on/off command signal is applied to switching regulator 27. Upon receipt of a turn-on command signal, switching regulator 27 begins to function to generate the regulated B+ voltage at terminal 28, derived from the unregulated input voltage $V_i$ developed at terminal 23. Upon receipt of a turn-off command signal, switching regulator 27 ceases to function to generate the B+ supply voltage, removing operative power from the circuits energized by the B+ supply voltage.

With such an arrangement as described, television receiver on/off energization is accomplished by controlling the functioning of the regulator circuit rather than by controlling the operation of an electromechanical relay in the input supply circuit associated with mains supply 20. Thus, the unregulated DC input voltage $V_i$ is present at terminal 23 both in the on-state and in the off-state of the television receiver operation.

Figure 2:
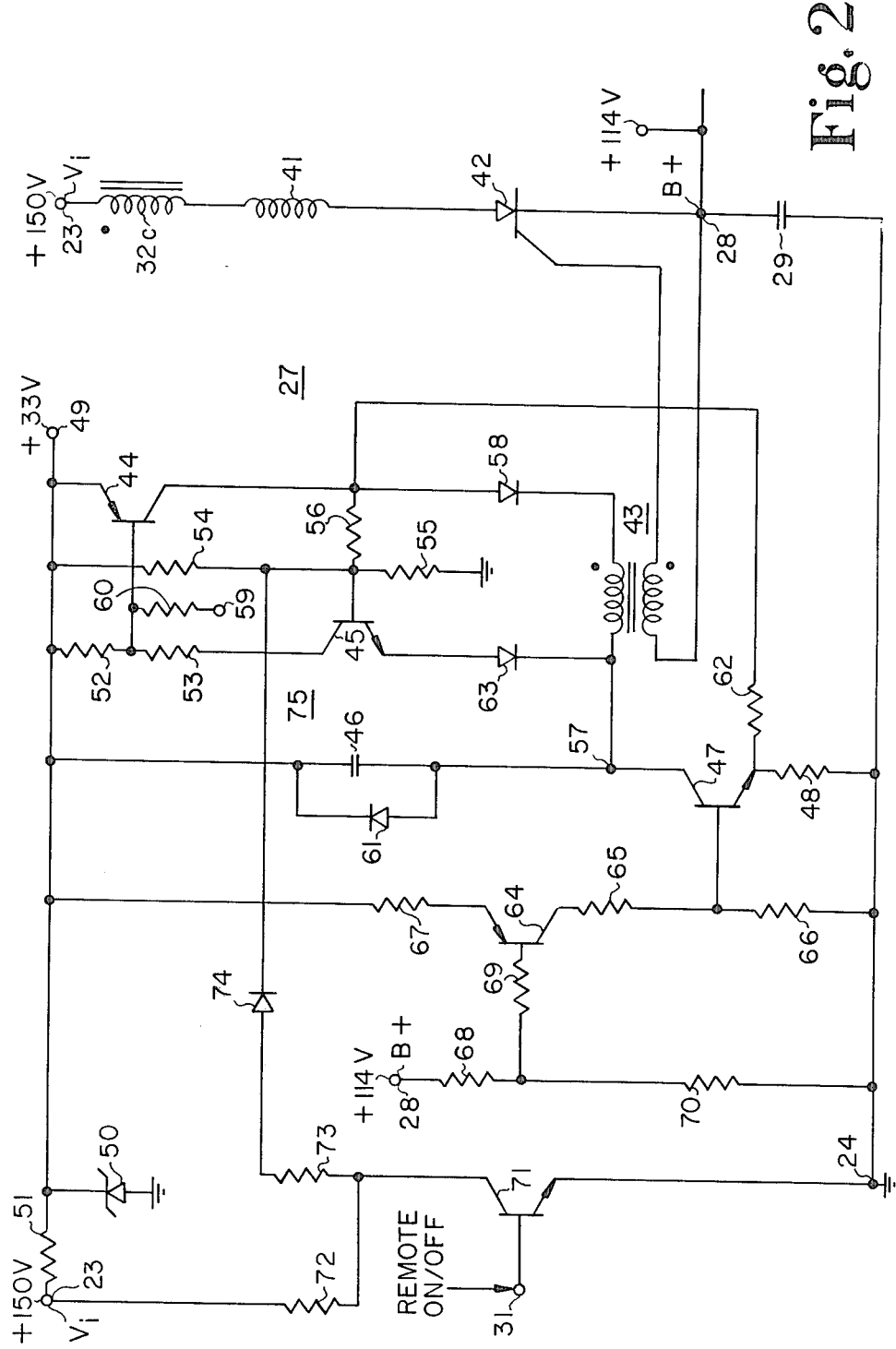
FIG. 2 illustrates a portion of the circuit of FIG. 1 including an embodiment of the switching regulator circuit.

An embodiment of remote on/off controlled switching regulator 27 is illustrated in FIG. 2. Coupled between terminal 23, at which terminal the unregulated DC input voltage $V_i$ is developed, and terminal 28, at which terminal the regulated B+ voltage is developed, is the series arrangement of flyback transformer winding 32c, an inductor 41 and a silicon controlled rectifier 42. At a controlled instant within each horizontal trace interval, a gating pulse developed in a secondary winding of a gate transformer 43 is applied across the gate and cathode electrodes of SCR 42, turning on the SCR. Current flows from terminal 23 to terminal 28 through SCR 42 to replenish the energy supplied to the load circuits coupled to terminal 28. During horizontal retrace, the negative retrace pulse voltage developed in flyback transformer winding 32c commutates off SCR 42.

Regulation is achieved by varying the turn-on instant of SCR 42 within the horizontal trace interval in response to changes in a deflection energy level as represented by the B+ supply voltage. Switching regulator 27 includes a relaxation oscillator 75 comprising relaxation oscillator transistors 44 and 45, capacitor 46, and a control transistor 47, with an emitter electrode coupled to ground through a resistor 48. A diode 63 is in series with the emitter of transistor 45. A +33 voltage supply rail 49 is provided at the cathode of a zener diode 50 by applying the unregulated input voltage $V_i$ to the rail through a resistor 51.

Transistors 44 and 45 together with resistors 52-56 form an oscillator latching circuit. With transistors 44 and 45 both in cutoff, a predetermined threshold voltage level is established at the base of transistor 45 by voltage dividing resistors 54 and 55. As capacitor 46 controllably charges during the beginning portions of the horizontal trace interval, the voltage at a terminal 57, a junction of capacitor 46, transistor 47 and diode 63, decreases until, at a controlled instant within horizontal trace, transistor 45 becomes forward biased, regeneratively turning on transistors 44 and 45 into saturated conduction. With transistor 44 in saturated conduction, resistor 54 is effectively paralleled by resistor 56, establishing a higher threshold voltage level at the base of transistor 45.

Capacitor 46 discharges through transistor 44, a diode 58 and the primary winding of gate transformer 43, thereby applying a turn-on gating pulse to SCR 42 at a controlled instant within the horizontal trace interval. The exact turn-on instant is determined by the biasing of control transistor 47, which transistor controls the charging rate of capacitor 46. Capacitor 46 continues to discharge until the voltage at terminal 57 has increased sufficiently to remove the forward bias of transistor 45 and cut off transistors 44 and 45, thereby beginning another charge cycle.

Terminal 59 of flyback transformer secondary winding 32d of FIG. 1 is coupled to the base of transistor 44 through a resistor 60. The negative retrace pulse applied to the base of transistor 44 turns on transistors 44 and 45, causing capacitor 46 to discharge, thereby synchronizing the initial charging of capacitor 46 each deflection cycle. A diode 61, paralleling capacitor 46, prevents the opposite polarity charging of the capacitor. A resistor 62 is coupled between the emitter electrode of control transistor 47 and the collector electrode of transistor 44 for biasing off transistor 47 when capacitor 46 is discharging.

The collector electrode of a comparator transistor 64 is coupled to the base of transistor 47 through a resistor 65 of voltage dividing resistors 65 and 66 for controlling the conduction of transistor 47. The emitter of transistor 64 is coupled to the +33 volt supply rail reference voltage through a resistor 67. The B+ supply voltage at terminal 28 is compared with the reference voltage by coupling terminal 28 to the base of transistor 64 through resistors 68 and 69, with the junction of resistors 68 and 69 coupled to ground through a resistor 70.

Remote on/off operation of the television receiver is accomplished by enabling switching regulator 27 to respond to the on/off command signal applied to conductor line 31. Conductor line 31 is coupled to the base of a remote control transistor 71. The collector of transistor 71 is coupled to terminal 23 through a resistor 72 and is coupled to the base of relaxation oscillator transistor 45 through a resistor 73 and a diode 74.

When the voltage on conductor line 31 is at an upper voltage level or on-state, transistor 71 is conducting, thereby reverse biasing diode 74 and enabling relaxation oscillator 75 to oscillate and provide gating pulses to SCR 42 in order to develop a B+ supply voltage for the television receiver. When the voltage on conductor line 31 is at a lower voltage level or off-state, transistor 71 is cut off, thereby forward biasing diode 74 and disabling relaxation oscillator 75, thereby removing operative B+ supply voltage from terminal 23 and the various television receiver circuits.

A high voltage safety circuit 77, illustrated in FIG. 1, obtains part of its operative power from the regulated B+ supply voltage terminal 23 through a resistor 76. High voltage safety circuit 77 also obtains part of its operative power from the unregulated DC input supply voltage terminal 23 through a resistor 78. Safety circuit 77 includes a detection circuit 79, the output of which is responsive to the high voltage generated at ultor terminal U, as represented by the retrace pulses developed in flyback transformer secondary winding 32e. Voltage dividing resistors 80 and 81 are coupled across flyback transformer secondary winding 32e. The junction of resistors 80 and 81 is coupled to a capacitor 82 through a current limiting resistor 83 and a diode 84. A peak detected retrace signal voltage is developed across capacitor 82.

Capacitor 82 is coupled to the emitter of a transistor 85 through a resistor 91 of voltage dividing resistors 91 and 92. Coupled across the base and emitter electrodes of transistor 85 is the series arrangement of a diode 87 and a resistor 88, with the cathode of diode 87 coupled to the emitter of transistor 85. The junction terminal 93 of the anode of diode 87 and resistor 88 is coupled to the junction of resistors 76 and 78 at the cathode of a zener diode reference voltage source 94, the zener diode having a breakdown voltage of +33 volts, illustratively.

The PNP transistor 85 and an NPN transistor 86 are coupled together so as to form a regenerative disabling latch circuit 95. The emitter of transistor 86 is coupled to the base of horizontal driver transistor 38. When latch 95 is energized due to the development of a sufficiently large peak detected retrace signal voltage, indicative of an abnormal high voltage condition, sufficient sustaining current $i_s$ flows into terminal 93 to maintain disabling latch 95 in the regenerative on-stage. A disabling signal current flows from the emitter of transistor 86 to the base of horizontal driver transistor 38 and maintains transistor 38 conductive during the interval that latch 95 is energized. Horizontal output transistor 35 is reverse biased during this interval, thereby disabling normal operation of deflection generator 30 and preventing the generation of an abnormal high voltage at ultor terminal U. An integrating capacitor 89 and resistor 90 are coupled across the base and emitter electrodes of transistor 86 to prevent transient conditions from energizing or nuisance tripping latch 95 and unnecessarily disabling deflection and high voltage generator 30.

Under normal steady-state television receiver operating conditions, the peak detected retrace signal voltage developed across capacitor 82 is low enough to enable diode 87 to be forward biased, thereby maintaining the emitter voltage of transistor 85 at one diode voltage drop less than the +33 volt zener voltage established at terminal 93. Transistor 85 is reverse biased and disabling latch 95 deenergized.

Should the high voltage exceed predetermined values, the peak detected retrace signal voltage raises the emitter voltage of transistor 85 sufficiently to forward bias transistor 85 into conduction. Transistor 86 turns on in a regenerative manner until both transistors 85 and 86 are in a regenerative, saturated conduction state.

With disabling latch 95 energized, the voltage at terminal 93 is near ground potential, bringing zener diode 94 out of zener breakdown. A sustaining current $i_s$ flows into terminal 93 and maintains disabling latch 95 energized even after deflection and high voltage generator 30 has been shut down and the retrace pulse voltages in the flyback transformer windings are no longer developed. The sustaining current $i_s$, which during latch energization flows mainly through resistor 88 and the collector-to-emitter path of transistor 86, is derived from two voltage sources. A first sustaining current component $i_1$, flowing through resistor 78, is derived from the voltage developed at the regulated B+ supply terminal 28. A second sustaining current component $i_2$, flowing through resistor 76, is derived from the unregulated input voltage $V_i$ developed at terminal 23.

The unregulated input voltage sustaining current component $i_2$ is, by itself, not sufficiently large to sustain energization of disabling latch 95. Should current component $i_1$ cease to flow into terminal 93, when, for example, the operator turns off the television receiver and regulator 27 terminates provision of the B+ voltage in response to the off-state of the command signal, the voltage drop developed by current component $i_2$ across resistor 88 is insufficient to maintain transistor 85 in conduction, thereby turning off or deenergizing disabling latch 95. The operator thus may subsequently turn the television receiver back on to resume normal television receiver operation if the abnormal condition which originally energized the latch has abated.

In the remote on/off controlled switching regulator power supply illustrated in FIG. 1, the unregulated input voltage $V_i$ is present at terminal 23 even though the television receiver is turned off, that is, independent of the on/off state of the receiver. Had disabling latch 95 been provided with only a single source of sustaining current obtained from the unregulated input voltage terminal 23, and large enough to sustain latch energization, the latch would undesirably be energized even after the television receiver is turned off by the operator.

During the television receiver start-up interval, the retrace pulse voltage developed in flyback transformer winding 32c initially is not of sufficient amplitude to commutate off regulator switch SCR 42. Relatively large load currents initially flow into and out of terminal 23 to charge the uncharged capacitors in the various load circuits coupled to terminal 23. As as result, during start-up and also during certain transitory picture tube arcing conditions, the voltage at terminal 28 will undergo a low frequency oscillation, reaching at times relatively low voltage levels. Had disabling latch 95 been provided with only a single source of sustaining current obtained from the regulated B+ voltage terminal 23, the voltage at terminal 23 during television receiver start-up may become low enough to bring zener diode 94 out of reverse bias zener breakdown and enable retrace pulses developed in winding 32e to nuisance trip safety circuit 77.

Had the sustaining current voltage source been derived from an auxiliary supply developed by flyback transformer 32, the television receiver could undesirably cycle between shutdown mode of operation and start-up mode of operation. The disabling latch would turn off when the flyback transformer derived sustaining supply to the latch is disabled from the previous latch energization. The latch would then turn back on when the flyback transformer supply is redeveloped. Such automatic cycling may apply harmful stresses to various television receiver components.

By providing two sustaining current components for disabling latch 95, derived from two voltage sources, with at least one of the sustaining currents being of insufficient magnitude to by itself maintain the disabling latch energized or in a regeneratively conducting state, proper safety circuit operation is maintained.

Selected circuit values and component types for the circuit of FIG. 1 are listed below:
Capacitor 26: 600 microfarad
Capacitor 29: 1.5 microfarad
Capacitor 82: 0.1 microfarad
Capacitor 89: 0.1 microfarad
Resistor 76: 68 kilohm
Resistor 78: 33 kilohm
Resistor 80: Selectable-0, 34, or 68 ohms
Resistor 81: 2200 ohm
Resistor 83: 100 ohm
Resistor 88: 270 ohm
Resistor 90: 100 kilohm
Resistor 91: 16.2 kilohm
Resistor 92: 39.2 kilohm
Diode 84: small signal diode
Diode 87: small signal diode
Zener Diode 94: 33 volt, 400 milliwatt
Transistor 85: General purpose, PNP, $\beta > 100$
Transistor 86: General purpose, NPN, $\beta > 100$
Voltage $V_i$: 150 volt
B+ Voltage: 114 volt
Peak retrace voltage developed in flyback transformer secondary winding 32e: 50 volt–60 volt
The exact values for several of the components such as values for resistors 88, 91 and 92 may vary depending on such factors as the beta of transistors 85 and 86, the nominal peak retrace pulse voltage developed in winding 32e, and the value selected for resistor 80.

What is claimed is:

1. A deflection and high voltage system with a disabling circuit, comprising:
   a deflection winding;
   a deflection generator coupled to said deflection winding for generating scanning current in said deflection winding;
   a transformer coupled to said deflection winding;
   high voltage generating means coupled to said transformer for generating a high voltage;
   detection means responsive to said high voltage for generating a first signal representative of high voltage;
   a disabling latch coupled to said detection means and to said deflection generator for generating a disabling signal for disabling normal deflection generator operation upon energization of said latch by said detection means when said first signal exceeds predetermined values; and
   means coupled to said disabling latch for providing a sustaining current to said latch for maintaining said latch in a regeneratively conducting state upon latch energization;
   wherein said sustaining current providing means includes a first source of voltage coupled to said disabling latch for providing a first component of said sustaining current to said latch, and a second source of voltage coupled to said disabling latch for providing a second component of said sustaining current to said latch, at least one of said first and second sustaining current components being by itself of insufficient magnitude to maintain said disabling latch in a regeneratively conducting state.

2. A system according to claim 1 wherein said first voltage source comprises a source of unregulated input voltage and said second voltage source comprises a regulator circuit coupled to said source of input voltage at a first terminal and coupled to said deflection generator at a second terminal for providing said deflection generator with a regulated voltage at said second terminal for energizing said deflection generator;
   said system also including means for rendering said regulator circuit responsive to the state of an on/off command signal for controlling the energization of said deflection generator, said regulator terminating provision of said regulated voltage to said deflection generator and of said second sustaining current component to said latch in response to an off state of said on/off command signal.

3. A system according to claim 2 wherein said source of unregulated input voltage provides said first sustaining current component to said latch with independence of the state of said on/off command signal, said first sustaining current component being by itself of insufficient magnitude to maintain said disabling latch in a regeneratively conducting state.

4. A system according to claim 3 wherein said disabling latch comprises first and second transistors regeneratively coupled together, said first signal being applied to one of a base electrode and emitter electrode of said first transistor.

5. A system according to claim 4 including a diode and a resistance serially coupled between base and emitter electrodes of said first transistor, said first and second sustaining current components flowing into a junction terminal of said diode and resistance.

6. A system according to claim 5 including a zener diode coupled to said junction terminal in such manner as to be reverse biased by said sustaining current, said first sustaining current component being by itself of insufficient magnitude to maintain said zener diode in a state of reverse breakdown.

* * * * *